Patented May 5, 1925.

1,536,419

UNITED STATES PATENT OFFICE.

ARTHUR W. BURWELL, OF POUGHKEEPSIE, NEW YORK.

PROCESS OF EFFECTING ORGANIC REACTIONS.

No Drawing.   Application filed January 26, 1922. Serial No. 532,009.

*To all whom it may concern:*

Be it known that I, ARTHUR W. BURWELL, a citizen of the United States, residing at Poughkeepsie, in the county of Dutchess and State of New York, have invented certain new and useful Improvements in Processes of Effecting Organic Reactions, of which the following is a specification.

This invention relates to those electrolytic processes which have for their object the oxidation, reduction or other transformation of organic substances. In processes of this type the organic body is usually suspended in or emulsified with a suitable electrolyte, such for example as a solution of sulfuric acid, and is maintained in contact with or proximity to the anode or cathode of an electrolytic cell, according as it is to be subjected to oxidizing or reducing influences. It has also been proposed to use permeable electrodes in the form of tubes or the like, the organic liquid to be transformed being caused to seep outwardly through the electrode walls into presence of the electrolyte. Such permeable electrodes present the defect however that it is impracticable to maintain a continuous film over the entire electrode surface; and when the film is interrupted at any point the electrolytic action becomes irregular, and undesirable side reactions supervene with a rapid diminution of the yields of the desired product.

According to the present invention I employ, either as anode or cathode according as the desired reaction is of an oxidizing or reducing type, electrodes which are readily wetted by the organic liquid or solution to be treated; and I provide a creeping or flowing film of such liquid or solution, moving over the active electrode surface. In order to provide a satisfactory film of this character it is necessary that the organic substance to be treated should be in liquid form and substantially insoluble in or immiscible with the electrolyte; and that it should have a specific gravity distinctly above or below that of the electrolyte. The film tends to move in irregular and shifting lines of flow, but its general direction of movement is either upward or downward according as the specific gravity is below or above that of the electrolyte; and the film-forming organic liquid is accordingly introduced at or near the bottom of the electrode in case its specific gravity is relatively low, or at or near the top of the electrode in case it is high. It may be supplied to the interior of a hollow electrode provided with a series of minute, usually capillary, apertures leading to the outer surface: or in other electrode forms it may be fed to the surface through capillary tubes or the like, all that is necessary in either case being to provide a sufficient flow of the liquid for the maintenance of an intact film which, to all appearance at least, is continuous. This usually requires a rate of supply which is decidedly above the reaction requirements; and accordingly I prefer to collect and return the liquid to the active electrode surface in continuous cycle. The liquid is of course collected above or below the electrolyte according to their relative specific gravities.

As stated above it is essential that the electrode surface should be one which is readily wetted by the organic liquid: and it is further essential to the best results that the electrode should be thoroughly wetted with the organic liquid before it is immersed in the aqueous electrolyte; for if opportunity is given for the formation of an aqueous film on any part of the surface it will be found difficult or impossible thereafter to replace this by the organic film. I have found that the best results are obtained when the electrode surfaces are somewhat rough in character; such for example as non-polished surfaces of carbon, or when metal electrodes are used, surfaces of a more or less rough, porous or spongy character. My invention is not limited however to the use of surfaces of this type.

The invention is applicable to a very wide range of organic oxidations or reductions, as will be obvious to those skilled in this particular art: and it will be further understood that the material of the electrode must be chosen by reference to the particular reaction desired; for as is well known, the nature of the reaction is to a large extent dependant on the electrode surface. In a typical case for example I use for the reduction of nitrobenzol to aniline a cathode having a tin surface, and an electrolyte of sulfuric acid. A carbon or graphite cathode, under similar conditions, will yield at ordinary temperatures phenyl-hydroxylamin; or, at a higher temperature range, paramido-phenol. The present invention is however not concerned primarily with specific reacting conditions, but with the broad principle, which I believe to be novel, of the employment of creeping or flowing films of the organic liquid to be transformed, such films moving over the active face of the electrode.

Such liquids are usually known as non-conductors of electricity, and it might be supposed that a continuous film of the liquid over the electrode face would interrupt the current flow or at least materially increase the voltage requirements. Such however is not the case. Although the films are to all appearance continuous and intact over the entire electrode surface the fall of potential between the electrodes is, in many cases at least, actually less than when no film is flowing, indicating a depolarizing or similar effect due to the film components.

While I prefer to use a flowing film, my invention is not limited thereto, as an intact or continuous film maintained or produced by other methods will produce the same result.

I claim:

1. Process of effecting organic reactions comprising causing an electric current to flow through an aqueous electrolyte to an electrode, and maintaining on the active surface of said electrode a moving film of an organic liquid to be transformed said organic liquid being substantially insoluble in and immiscible with said electrolyte.

2. Process according to claim 1 in which the film-forming liquid is supplied in excess of the reaction requirements, and cyclically returned to the surface of the electrode.

3. Process according to claim 1 in which the electrode is provided with a non-polished surface readily wetted by the organic liquid.

4. Process of effecting organic reactions comprising causing an electric current to flow through an aqueous electrolyte to an electrode, and producing on the active surface of said electrode a film of an organic liquid to be transformed said organic liquid being substantially insoluble in and immiscible with said electrolyte.

In testimony whereof, I affix my signature

ARTHUR W. BURWELL.